United States Patent [19]

Etzbach et al.

[11] Patent Number: 6,143,898

[45] Date of Patent: *Nov. 7, 2000

[54] PYRIDONE COLORANTS

[75] Inventors: Karl-Heinz Etzbach, Frankenthal; Rüdiger Sens, Mannheim, both of Germany

[73] Assignee: BASF Aktiengesellschaft, Ludwigshafen, Germany

[*] Notice: This patent is subject to a terminal disclaimer.

[21] Appl. No.: 09/147,277

[22] PCT Filed: May 9, 1997

[86] PCT No.: PCT/EP97/02392

§ 371 Date: Nov. 18, 1998

§ 102(e) Date: Nov. 18, 1998

[87] PCT Pub. No.: WO97/45491

PCT Pub. Date: Dec. 4, 1997

[30] Foreign Application Priority Data

May 24, 1996 [DE] Germany .......................... 196 21 026

[51] Int. Cl.⁷ ................................................. C07D 417/06
[52] U.S. Cl. ............................................. 546/270.7; 8/568
[58] Field of Search .......................................... 546/270.7

[56] References Cited

U.S. PATENT DOCUMENTS

| | | |
|---|---|---|
| 5,079,365 | 1/1992 | Sens et al. . |
| 5,132,438 | 7/1992 | Bach et al. . |
| 5,545,235 | 8/1996 | Sens et al. .............................. 503/227 |
| 5,719,288 | 2/1998 | Sens et al. .......................... 546/270.7 |

FOREIGN PATENT DOCUMENTS

| | | |
|---|---|---|
| 0 399 473 | 5/1990 | European Pat. Off. . |
| 0 416 434 | 3/1991 | European Pat. Off. . |
| 0 454 049 | 10/1991 | European Pat. Off. . |
| 0 680 834 | 11/1995 | European Pat. Off. . |
| 43 44 116 | 6/1995 | Germany . |
| 63-247 092 | 10/1988 | Japan . |
| WO 95/21219 | 8/1995 | WIPO . |

*Primary Examiner*—Jane Fan
*Attorney, Agent, or Firm*—Oblon, Spivak, McClelland, Maier & Neustadt, P.C.

[57] ABSTRACT

Pyridone dyes useful for thermal transfer and for dyeing or printing synthetic materials have the formula

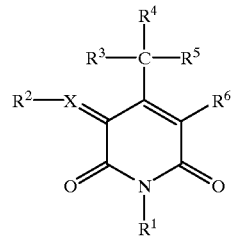

where X is CH or nitrogen, $R^1$ is substituted or unsubstituted $C_1$–$C_{20}$-alkyl or substituted or unsubstituted phenyl, $R^2$ is a carbocyclic or heterocyclic radical, $R^3$ is hydrogen or $C_1$–$C_4$-alkyl, $R^4$ is hydrogen or $C_1$–$C_4$-alkyl, $R^5$ is substituted or unsubstituted $C_1$–$C_8$-alkyl or substituted or unsubstituted phenyl, and $R^6$ is cyano, carbamoyl, carboxyl, $C_1$–$C_4$-alkoxycarbonyl or $C_1$–$C_4$-alkanoyl.

5 Claims, No Drawings

PYRIDONE COLORANTS

DESCRIPTION

The present invention relates to novel pyridone dyes of the formula I

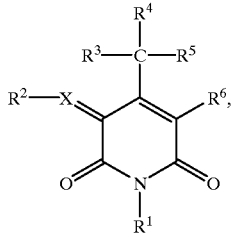

(I)

where

- $R^1$ is $C_1$–$C_{20}$-alkyl with or without substitution and with or without interruption by from 1 to 4 oxygen atoms in ether function or is substituted or unsubstituted phenyl,
- $R^2$ is a 5- or 6-membered carbocyclic or heterocyclic radical with or without benzofusion,
- $R^3$ is hydrogen or $C_1$–$C_4$-alkyl,
- $R^4$ is hydrogen or $C_1$–$C_4$-alkyl,
- $R^5$ is $C_1$–$C_8$-alkyl with or without interruption by 1 or 2 oxygen atoms in ether function and with or without phenyl or hydroxyl substitution, or is substituted or unsubstituted phenyl, and
- $R^6$ is cyano, carbamoyl, carboxyl, $C_1$–$C_4$-alkoxycarbonyl or $C_1$–$C_4$-alkanoyl, to a process for the thermal transfer of these dyes and to their use for dyeing or printing synthetic materials.

U.S. Pat. No. 5,079,365 discloses pyridone dyes with a methyl group in position 4 of the pyridine ring.

It is an object of the present invention to provide novel pyridone dyes having a different chemical structure and advantageous properties.

We have found that this object is achieved by the pyridone dyes of the formula I defined at the beginning.

$R^2$ is a 5- or 6-membered carbocyclic or heterocyclic radical with or without substitution and with or without benzofusion.

$R^2$ can be derived for example from components of the benzene, indole, quinoline, naphthalene, pyrrole, thiazole, benzimidazole, benzothiazole, thiophene or diaminopyridine series.

Important $R^2$ radicals include for example those of the formulae IIa to IIj

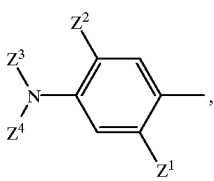

(IIa)

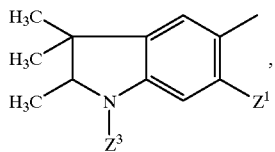

(IIb)

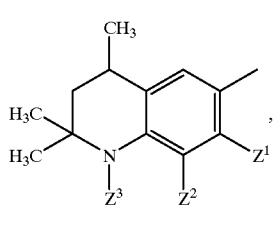

(IIc)

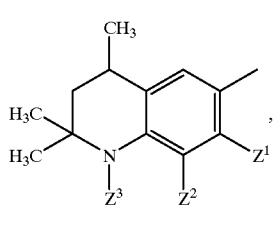

(IId)

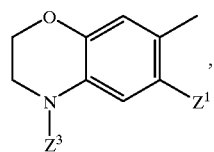

(IIe)

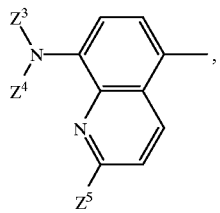

(IIf)

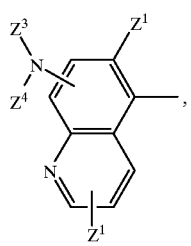

(IIg)

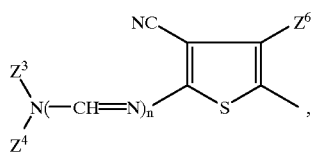

(IIh)

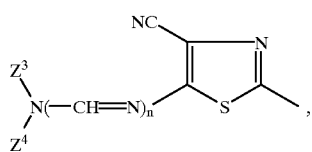

(IIi)

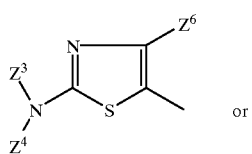

or

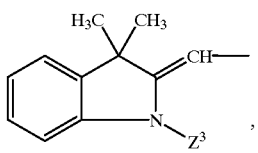
(IIj)

where n is 0 or 1, $Z^1$ is hydrogen, $C_1$–$C_8$-alkyl with or without interruption by 1 or 2 oxygen atoms in ether function, hydroxyl, $C_1$–$C_4$-alkoxy, especially methoxy or ethoxy, formylamino, $C_1$–$C_4$-alkylsulfonylamino, mono- or di($C_1$–$C_4$-alkyl)aminosulfonylamino or the radical —NHCOZ$^7$ or —NHCO$_2$Z$^7$, where $Z^7$ is phenyl, benzyl, tolyl or $C_1$–$C_8$-alkyl with or without interruption by 1 or 2 oxygen atoms in ether function, $Z^2$ is hydrogen, $C_1$–$C_4$-alkyl, especially methyl, or $C_1$–$C_4$-alkoxy, especially methoxy or ethoxy, $Z^3$ and $Z^4$ are independently of each other hydrogen, $C_1$–$C_8$-alkyl with or without substitution and with or without interruption by 1 or 2 oxygen atoms in ether function, $C_3$–$C_4$-alkenyl, $C_5$–$C_7$-cycloalkyl or substituted or unsubstituted phenyl, or are together with the adjacent nitrogen atom a 5- or 6-membered saturated heterocyclic radical with or without further heteroatoms, $Z^5$ is hydrogen or $C_1$–$C_4$-alkyl, especially methyl, and $Z^6$ is hydrogen, halogen, $C_1$–$C_8$-alkyl, substituted or unsubstituted phenyl, substituted or unsubstituted benzyl, cyclohexyl, thienyl, hydroxyl, $C_1$–$C_4$-alkoxy, $C_1$–$C_4$-alkylthio or mono($C_1$–$C_8$-alkyl)amino.

Any alkyl or alkenyl appearing in the hereinmentioned formulae may be straight-chain or branched.

Any substituted alkyl appearing in the hereinmentioned formulae may contain as substituents for example substituted or unsubstituted phenyl, substituted or unsubstituted phenoxy, carboxyl, $C_1$–$C_{20}$-alkoxycarbonyl whose alkyl chain is with or without interruption by from 1 to 4 oxygen atoms in ether function and with or without phenyl or phenoxy substitution, hydroxyl, halogen, cyano, $C_1$–$C_8$-alkanoyloxy, $C_1$–$C_8$-alkylaminocarbonyloxy or $C_1$–$C_8$-alkoxycarbonyloxy, the alkoxy group in the last three cases being with or without phenyl or $C_1$–$C_4$-alkoxy substitution. The number of substituents in substituted alkyl is generally from 1 to 3.

In any alkyl appearing in the hereinmentioned formulae with interruption by oxygen atoms in ether function, the number of oxygen atoms interrupting in ether function is preferably 1 or 2.

Any substituted phenyl or thienyl appearing in the hereinmentioned formulae may contain as substituents for example $C_1$–$C_4$-alkyl, trifluoromethyl, $C_1$–$C_4$-alkoxy, halogen, nitro or carboxyl. The number of substituents in substituted phenyl or thienyl is generally from 1 to 3.

Suitable $R^1$, $R^3$, $R^4$, $R^5$, $Z^1$, $Z^2$, $Z^3$, $Z^4$, $Z^5$, $Z^6$ and $Z^7$ are each for example, like the belowmentioned $L^2$ and $L^3$, methyl, ethyl, propyl, isopropyl, butyl, isobutyl, sec-butyl or tert-butyl.

$R^1$, $R^5$, $Z^1$, $Z^3$, $Z^4$, $Z^6$ and $Z^7$ may each also be for example pentyl, isopentyl, neopentyl, tert-pentyl, hexyl, 2-methylpentyl, heptyl, octyl, 2-ethylhexyl or isooctyl.

$R^1$ may also be for example nonyl, isononyl, decyl, isodecyl, undecyl, dodecyl, tridecyl, isotridecyl, tetradecyl, pentadecyl, hexadecyl, heptadecyl, octadecyl, nonadecyl or eicosyl. (The designations isooctyl, isononyl, isodecyl and isotridecyl are trivial names derived from the oxo process alcohols (cf. Ullmann's Encyclopedia of Industrial Chemistry, 5th Edition, Vol. A1, pages 290 to 293, and also Vol. A 10, pages 284 and 285)).

$R^1$, $R^5$, $Z^1$, $Z^3$, $Z^4$ and $Z^7$ may each also be for example 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl or 4,8-dioxadecyl.

$R^1$ may also be for example 3,6,9-trioxadecyl, 3,6,9-trioxaundecyl, 3,6,9,12-tetraoxatridecyl or 3,6,9,12-tetraoxatetradecyl.

$R^1$, $R^5$, $Z^3$, $Z^4$ and $Z^6$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-fluorophenyl, 2-, 3- or 4-chlorophenyl, 2-, 3- or 4-trifluoromethylphenyl, 2-, 3- or 4-nitrophenyl or 2-, 3- or 4-carboxyphenyl.

$R^1$, $Z^3$ and $Z^4$ may each also be for example 2-carboxyethyl, 2-methoxycarbonylethyl, benzyl, 1- or 2-phenylethyl, 2-, 3- or 4-methylbenzyl, 2-, 3- or 4-methoxybenzyl, 2-, 3- or 4-chlorobenzyl, 2-, 3- or 4-nitrobenzyl, 3-benzyloxypropyl, phenoxymethyl, 6-phenoxy-4-oxahexyl, 8-phenoxy-4-oxaoctyl, 2-hydroxyethyl, 2- or 3-hydroxypropyl, fluoromethyl, chloromethyl, difluoromethyl, dichloromethyl, trifluoromethyl, trichloromethyl, 2-fluoroethyl, 2-chloroethyl, 2,2,2-trifluoromethyl, pentafluoroethyl, heptafluoropropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-Methoxycarbonylpropyl, 2-ethoxycarbonylethyl, 2- or 3-ethoxycarbonylpropyl, 2-methylaminocarbonyloxyethyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

$R^5$ may also be for example methoxymethyl, ethoxymethyl, propoxymethyl, butoxymethyl, benzyl, 1- or 2-phenylethyl, hydroxymethyl, 1- or 2-hydroxyethyl, 1-, 2- or 3-hydroxypropyl or 4-hydroxy-2-oxabutyl.

$Z^3$ and $Z^4$ may each also be for example cyclopentyl, methylcyclopentyl, cyclohexyl, methylcyclohexyl, cycloheptyl, allyl or methallyl.

$Z^1$ is for example methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

$Z^6$ may also be for example fluorine, chlorine, bromine, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino, 2-ethylhexylamino, methylthio, ethylthio, propylthio, isopropylthio or butylthio.

$R^5$, $Z^1$, $Z^2$ and $Z^6$ may each also be for example methoxy, ethoxy, propoxy, isopropoxy, butoxy, isobutoxy, sec-butoxy or tert-butoxy.

$Z^3$ and $Z^4$ combined with the adjacent nitrogen atom into a 5- or 6-membered saturated heterocyclic radical with or without further heteroatoms can be for example pyrrolidinyl, piperidinyl, morpholinyl, piperazinyl or N-($C_1$–$C_4$-alkyl)piperazinyl.

$R^6$ is for example methoxycarbonyl, ethoxycarbonyl, propoxycarbonyl, isopropoxycarbonyl, butoxycarbonyl, isobutoxycarbonyl or sec-butoxycarbonyl.

Preference is given to pyridone dyes of the formula I where $R^6$ is cyano.

Preference is further given to pyridone dyes of the formula I where $R^5$ is $C_1$–$C_5$-alkyl or phenyl.

Preference is further given to pyridone dyes of the formula I where $R^1$ is $C_1$–$C_{13}$-alkyl with or without substitution by $C_1$–$C_6$-alkanoyloxy, $C_1$–$C_8$-alkoxycarbonyl with or without interruption in the alkyl chain by 1 or 2 oxygen atoms in ether function, phenyl or $C_1$–$C_4$-alkylphenyl and with or without interruption by 1 or 2 oxygen atoms in ether function.

Particular preference is given to pyridone dyes of the formula I where $R^1$ is alkyl, alkoxyalkyl, alkanoyloxyalkyl or alkoxycarbonylalkyl, each of which has up to 12 carbon atoms, or unsubstituted or methyl-substituted benzyl.

Particular preference is further given to pyridone dyes of the formula I where $R^2$ is a radical of the abovementioned formula IIa, IIc, IIg or IIi, particularly a radical of the formula IIa or IIi, where $Z^1$ is hydrogen, $C_1$–$C_4$-alkyl, $C_1$–$C_4$-alkoxy or $C_1$–$C_8$-alkanoylamino, $Z^2$ is hydrogen, methyl, methoxy or ethoxy, $Z^3$ and $Z^4$ are independently of each other alkyl, alkoxyalkyl, alkanoyloxyalkyl or alkoxycarbonylalkyl, each of which has up to 12 carbon atoms, hydrogen, unsubstituted or methyl-substituted benzyl or phenyl, and $Z^6$ is hydrogen, $C_1$–$C_8$-alkyl, unsubstituted or $C_1$–$C_4$-alkyl- or $C_1$–$C_4$-alkoxy-substituted phenyl, benzyl or thienyl.

The dyes of the formula I of this invention are preparable in a conventional manner.

For example, those pyridone dyes of the formula I where X is CH can be obtained by condensing aldehydes of the formula III

$R^2$—CHO                                        (III)

where $R^2$ is as defined above, with pyridones of the formula IV

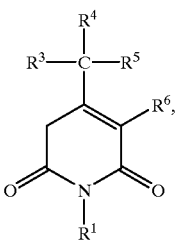

where $R^1$, $R^3$, $R^4$, $R^5$ and $R^6$ are each as defined above.

Those pyridone dyes of the formula I where X is nitrogen can be obtained for example by condensation of nitroso compounds of the formula V $R^2$—NO                                         (V), where $R^2$ is as defined above, or by oxidative coupling of amino compounds of the formula VI $R^2$—$NH_2$                                    (VI), where $R^2$ is as defined above, with the pyridones IV.

However, it is also possible to prepare the novel dyes of the formula I by the method known from WO-A-95/21219. For instance, a compound of the formula VII

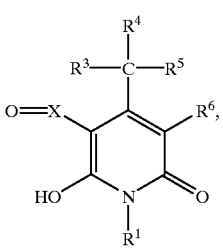

where X, $R^1$, $R^3$, $R^4$, $R^5$ and $R^6$ are each as defined above, can be condensed with a compound of the formula VIII $R^2$—H                                           (VIII), where $R^2$ is as defined above.

The pyridones of the formula IV can be prepared in a conventional manner. For example, a cyanoacetamide of the formula IX

NC—$CH_2$—CO—$NHR^1$             (IX), where $R^1$ is as defined above, can be condensed in a basic medium, for example in a solution of an alkali metal $C_1$–$C_4$-alkoxide in a $C_1$–$C_4$-alkanol, with an ester of the formula X

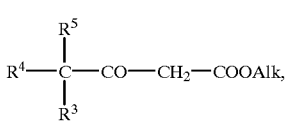

where $R^3$, $R^4$ and $R^5$ are each as defined above and Alk is $C_1$–$C_4$-alkyl.

The present invention further provides a process for transferring dyes from a transfer to a polymer-coated paper by diffusion or sublimation with the aid of an energy source, which comprises using a transfer comprising one or more pyridone dyes of the formula I.

To make the transfers required for the process of the present invention, the dyes of the formula I are incorporated in a suitable organic solvent or in mixtures of solvents with one or more binders, optionally in the presence of assistants, to form a printing ink. This printing ink preferably contains the dyes of the formula I for example in a molecularly disperse, ie. dissolved, form. The printing ink can be applied to the inert support for example by means of a doctor blade and for example air dried or using a hair dryer. Suitable organic solvents for the dyes of the formula I are for example those in which the solubility of the dyes of the formula I at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dyes to the inert support sufficiently firmly to prevent rubbing off. Preference is given to those binders which, after the air drying of the printing ink, include the dyes in the form of a clear, transparent film without any visible sign of crystallization of the dyes.

Such binders are mentioned for example in U.S. Pat. No. 5,132,438 or the pertinent patent applications cited therein. Also suitable are saturated linear polyesters.

Preferred binders include ethylcellulose, ethylhydroxyethylcellulose, polyvinyl butyral, polyvinyl acetate, cellulose propionate and saturated linear polyesters.

The weight ratio of binder: dye generally ranges from 1:1 to 10:1.

Suitable assistants include for example release agents as mentioned in U.S. Pat. No. 5,132,438 or the pertinent patent applications cited therein. Particularly suitable are organic additives which prevent the crystallizing out of the transfer dyes in the course of storage or on heating of the ink ribbon, for example cholesterol or vanillin.

Suitable inert supports are described for example in U.S. Pat. No. 5,132,438 or the pertinent patent applications cited therein. The thickness of the support generally ranges from 3 to 30 μm.

Suitable dye receiver layers include in general all thermally stable polymer layers with affinity for the dyes to be transferred, for example modified polycarbonates or polyesters. Further details can be found for example in U.S. Pat. No. 5,132,438 or the pertinent patent applications cited therein.

Transfer is effected by means of an energy source, for example by means of a laser or a thermal head, for which the latter has to be heatable to a temperature of 24 300° C. in order that the dye transfer may take place within the time range 0<t<15 msec. In the course of the transfer, the dye migrates out of the transfer sheet and diffuses into the surface coating of the receiving medium.

The novel dyes of the formula I are notable in the case of dye transfer for advantageous application properties. They exhibit high solubility in the ink ribbon (good compatibility with the binder), high stability in the printing ink, good transferability, good image stability (ie. good lightfastness and also good stability to environmental effects, for example moisture, temperature or chemicals), and permit flexible coloristic adaptation to given subtractive primary colors as part of an optimal trichromat (highest possible brilliance of primary or secondary colors and deep neutral black).

The novel pyridone dyes of the formula I are likewise advantageously suitable for dyeing or printing synthetic materials. Synthetic materials include for example polyesters, polyamides or polycarbonates. Particularly suitable materials are in textile form, such as fibers, yarns, threads, knits, wovens or nonwovens composed of polyester, modified polyester, e.g. anionically modified polyester, blends of polyester with cellulose, cotton, viscose or wool, or polyamide. The dyeing and printing conditions, which include dyeing in supercritical carbon dioxide, are known to those skilled in the art.

The novel pyridone dyes are also advantageously suitable for printing materials by the inkjet method. Besides those mentioned above, examples of suitable substrates are paper, glass, ceramics, plastics and metals.

The dyes of this invention can also be used for dyeing keratinous fibers, for example in hair dyeing or in dyeing furs.

The novel dyes of the formula I are also advantageously suitable for producing color filters as described for example in EP-A-399 473.

Finally, they can also be used with advantage as colorants for the preparation of toners for electrophotography.

The Examples which follow illustrate the invention.

A) Preparation

EXAMPLE 1 a) 788 ml of methyl cyanoacetate were added dropwise to 555 g of 40% strength by weight aqueous methylamine solution at not more than 30° C. The reaction mixture was stirred overnight at 20° C. It was then cooled down to 0–5° C., and the resulting precipitate was filtered off with suction and washed with ethanol. It was dried at 50° C. under reduced pressure to leave 478.8 g of cyanoacet-N-methylamide (mp.: 99° C.).

b) To a solution of 19.6 g of cyanoacet-N-methylamide in 100 ml of isopropanol were added dropwise at from 40 to 45° C. 26 g of methyl propionylacetate. Thereafter 43 g of 30% strength by weight methanolic sodium methoxide solution were added dropwise, and the mixture was stirred at 45° C. for 3 h and then overnight at 20° C. The solvent was then distilled off, methyl tert-butyl ether was added and the resulting precipitate was filtered off with suction, washed with diethyl ether and dried to leave 37.5 g of the pyridone of the formula

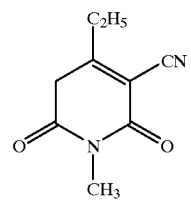

c) 4.45 g of the pyridone described under b) and 8.14 g of 2-dibutylamino-4-phenyl-5-formylthiazole (97% pure by weight) were heated to 140° C. for 15 min in 15 ml of acetic anhydride. After cooling, the resulting precipitate was filtered off with suction, washed with a little methanol and purified by column chromatography over silica gel (eluent: 8:2 v/v toluene:ethyl acetate) to leave 1.54 g of the dye of the formula

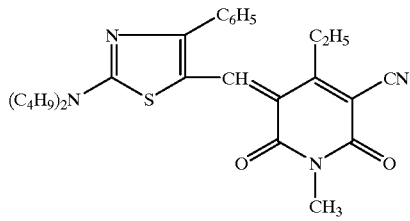

(mp.: 183° C.; $\lambda_{max}$ (in $CH_2C_{12}$): 535 nm)

EXAMPLE 2

Example 1 was repeated with methyl isobutyrylacetate in step b) instead of methyl propionylacetate, affording 2.05 g of the dye of the formula

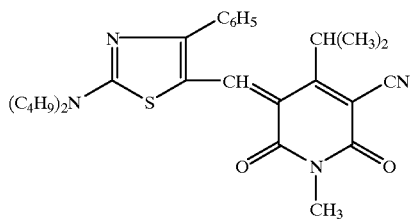

(mp.: 200–207° C.; $\lambda_{max}$ (in $CH_2Cl_2$): 534 nm)

The same method gives the dyes listed below in Tables 1 and 2.

TABLE 1

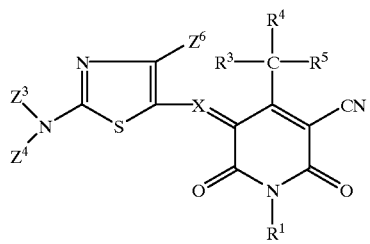

| Dye No. | X | $NZ^3Z^4$ | $Z^6$ | $R^1$ | $CR^3R^4R^5$ | $\lambda_{max}$ [nm] in $CH_2Cl_2$ |
|---|---|---|---|---|---|---|
| 3 | CH | $N[CH(CH_3)_2]_2$ | $C(CH_3)_3$ | $CH_3$ | $C_2H_5$ | 536 |
| 4 | CH | $N(C_3H_7)_2$ | $C(CH_3)_3$ | $CH_3$ | $C_2H_5$ | 534 |
| 5 | CH | $N[CH(CH_3)_2]_2$ | $C_6H_5$ | $CH_3$ | $C_2H_5$ | 537 |
| 6 | CH | $N(C_6H_{13})_2$ | $C_6H_5$ | $CH_3$ | $C_2H_5$ | 535 |
| 7 | CH | $N(C_6H_{13})_2$ | $C_6H_5$ | $CH_3$ | $CH(CH_3)_2$ | 534 |
| 8 | N | $N(C_4H_9)_2$ | $C_6H_5$ | $CH_3$ | $C_2H_5$ | 586 |

TABLE 2

| Dye No. | X | $NZ^3Z^4$ | $Z^1$ | $Z^2$ | $R^1$ | $CR^3R^4R^5$ | $\lambda_{max}$ [nm] (in $CH_2Cl_2$) |
|---|---|---|---|---|---|---|---|
| 9 | N | N(C_4H_9)(C_2H_5) | $CH_3$ | H | $CH_3$ | $C_2H_5$ | 663 |
| 10 | N | $N(C_2H_5)_2$ | $CH_3$ | H | $CH_3$ | $C_2H_5$ | 663 |

B) Dye Transfer a) 10 g of dye are stirred, if necessary with brief heating to 80–90° C., into 100 g of a 10% strength by weight solution of a binder in a methyl ethyl ketone/toluene/cyclohexanone mixture (4.5:2:2 v/v/v).

The resulting printing ink is applied with a 6 μm doctor knife to a 6 μm thick polyester film which has a suitable slipping layer on the back and is blown dry with a hair dryer for 1 minute. Before the ink ribbon can be printed, it has to be air dried for at least a further 24 hours, since solvent residues can impair the printing process.

b) The ink ribbons are printed up on an experimental computer-controlled apparatus equipped with a commercial thermal head, onto commercial videoprint paper (type VY-S from Hitachi).

The voltage is altered to control the energy emitted by the thermal head, the length of the pulse having been set to 7ms and only one pulse being emitted at a time. The emitted energy ranges from 0.7 to 2.0 mJ/dot.

Since the depth of color is directly proportional to the supplied energy, it is possible to produce a color wedge for spectroscopic evaluation.

The depth of color is plotted against the supplied energy per heating element to determine the Q* value (=energy in mJ for the absorbance value of 1).

The results obtained are listed below in Table 3.

(Of the Q* and m data, the first value relates in each case to a binder based on polyester, the second in each case to a binder based on polyvinyl butyral.)

TABLE 3

| Dye No. | Q* [mJ/dot] | m [1/mJ] |
|---|---|---|
| 1 | 0.87 | 3.00 |
|   | 0.92 | 2.40 |
| 2 | 0.85 | 3.36 |
|   | 0.90 | 2.73 |
| 3 | 0.76 | 5.69 |
|   | 0.81 | 4.29 |

TABLE 3-continued

| Dye No. | Q* [mJ/dot] | m [1/mJ] |
|---|---|---|
| 4 | 0.71 | 3.83 |
|   | 0.75 | 3.74 |
| 5 |      |      |
|   | 0.92 | 3.02 |
| 6 |      |      |
|   | 0.91 | 2.39 |
| 7 | 0.82 | 3.43 |
|   | 0.89 | 2.79 |
| 11 |     |      |
|   | 0.89 | 2.62 |
| 10 |     |      |
|   | 0.93 | 2.26 |

Table 4 below shows a comparison of the application properties of dye No. 3 with the known dye No. 11 of the formula

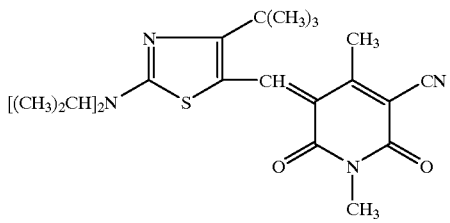

| Dye No. | Q* [mJ/dot] | m [1/m] | LF | TS |
|---|---|---|---|---|
| 3 | 0.76 | 5.69 | 29 |   |
|   | 0.81 | 4.29 |    | 1 |
| 11 | 0.79 | 3.35 | 12 |   |
|   | 0.82 | 2.97 |    | 2 |

The reported lightfastness (LF) is the number of hours of irradiation after which 20% of the amount of dye originally present on the untreated prints has been destroyed. The thermal stability (TS) is determined by aging the untreated prints in a drying cabinet for 1 week at 70° C. It is rated on a scale from 1 to 6, where 1 is very good and 6 is inadequate. (Here too the first value in each case relates to a binder based on polyester, the second in each case to a binder based on polyvinyl butyral.)

A comparison of dye No. 5 with the known dye No. 12 of the formula

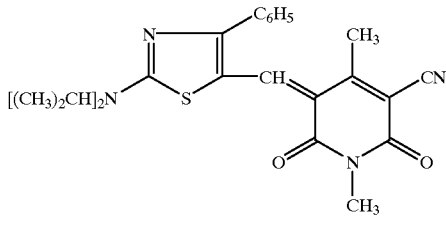

could not be carried out, since dye No. 12 is sparingly soluble and not compatible with the binders.

We claim:

1. Pyridone dyes of formula (I):

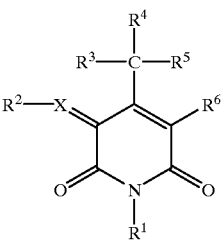

wherein:

X is CH;

$R^1$ is $C_1$–$C_{20}$-alkyl with or without substitution and with or without interruption by from 1 to 4 oxygen atoms in ether function or is substituted or unsubstituted phenyl;

$R^2$ is a thiazole of formula (IIi) as follows:

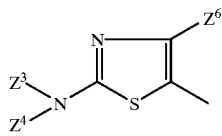

wherein $Z^3$ and $Z^4$ independently of each other are hydrogen, $C_1$–$C_8$-alkyl with or without substitution and with or without interruption by 1 or 2 oxygen atoms in ether function, $C_3$–$C_4$-alkenyl, and $Z^6$ is hydrogen, halogen, $C_1$–$C_8$-alkyl, substituted or unsubstituted phenyl, substituted or unsubstituted benzyl, cyclohexyl, thienyl, hydroxyl, $C_1$–$C_4$-alkoxy, $C_1$–$C_4$-alkylthio or mono($C_1$–$C_8$-alkyl)amino;

$R^3$ is hydrogen or $C_1$–$C_4$-alkyl;

$R^4$ is hydrogen or $C_1$–$C_4$-alkyl;

$R^5$ is $C_1$–$C_8$-alkyl with or without interruption by 1 or 2 oxygen atoms in ether function and with or without phenyl or hydroxyl substitution, or is substituted or unsubstituted phenyl; and $R^6$ is cyano, carbamoyl, carboxyl, $C_1$–$C_4$-alkoxycarbonyl or $C_1$–$C_4$-alkanoyl.

2. Pyridone dyes as claimed in claim 1, wherein $R^6$ is cyano.

3. Pyridone dyes as claimed in claim 1, wherein $R^5$ is $C_1$–$C_5$-alkyl or phenyl.

4. Pyridone dyes as claimed in claim 1, wherein $R^1$ is $C_1$–$C_{13}$-alkyl with or without substitution by $C_1$–$C_6$-alkanoyloxy, $C_1$–$C_8$-alkoxycarbonyl with or without interruption in the alkyl chain by 1 or 2 oxygen atoms in ether function, phenyl or $C_1$–$C_4$-alkylphenyl and with or without interruption by 1 or 2 oxygen atoms in ether function.

5. A pyridone dye according to claim 1, which is of the formula:

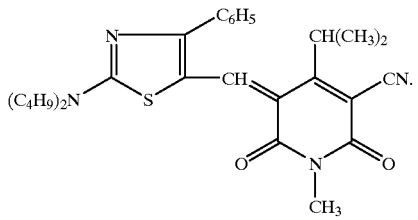

* * * * *